Oct. 17, 1939.  W. BERNDT  2,176,451

VARIABLE CAPACITIVE VOLTAGE DIVIDER

Filed Oct. 20, 1937

INVENTOR.
WALTER BERNDT
BY
ATTORNEY.

Patented Oct. 17, 1939

2,176,451

UNITED STATES PATENT OFFICE

2,176,451

VARIABLE CAPACITIVE VOLTAGE DIVIDER

Walter Berndt, Berlin, Germany, assignor to Telefunken Gesellschaft für Drahtlose Telegraphie m. b. H., Berlin, Germany, a corporation of Germany Application October 20, 1937, Serial No. 169,965
In Germany October 20, 1936

9 Claims. (Cl. 178—44)

This invention is concerned with a variable capacitive voltage divider, especially adapted to field-intensity measuring means and measuring transmitters.

For radio frequency voltage division the following arrangement has been used in the prior art to act as a capacitive potentiometer possessing a large range of regulation: At one end inside a cylindrical tube is mounted a fixed insulated plate, while placed opposite thereto is a second plate being shiftable in axial direction. If the input potential between the fixed plate or coat and the tube is constant, the output potential between the movable coat and the tube will vary roughly in logarithmic proportion to the distance between the two coats or plates. And the range of adjustment will be so much larger, the greater the length of the tube compared to its diameter. In lieu of the plates or coats, also cylinders and mushroom-shaped arrangements have been employed.

However, potentiometers of this known kind involve drawbacks, several of which are mentioned below. The mounting thereof in a set is attended with difficulties because of the comparatively great length. Adjustment by longitudinal shift is not convenient and is inexact. The capacity between the fixed or stator plate and the outer shell is not independent of the position of the mobile plate. In fact, it grows as the movable plate approaches the stator plate, and this so much more so the higher the capacitive load of the output. This fact makes itself felt in a particularly annoying way whenever the input end is associated with a resonance circuit, for the natural wave is then found to be subject to constant changes as the potentiometer is set.

Now, these various shortcomings are obviated in an arrangement as hereinafter disclosed. According to the invention there are mounted in the space between two metallic cylinders which are rotatable inside each other concentrically, two capacity plates or plate systems or assemblies, one of which is secured to the outer and the other one to the inner cylinder so as to be insulated therefrom. The voltage to be divided is impressed between the cylinder arrangement and one of the plates, while the divided potential is taken off across the cylinder arrangement and the other plate.

Figure 1:
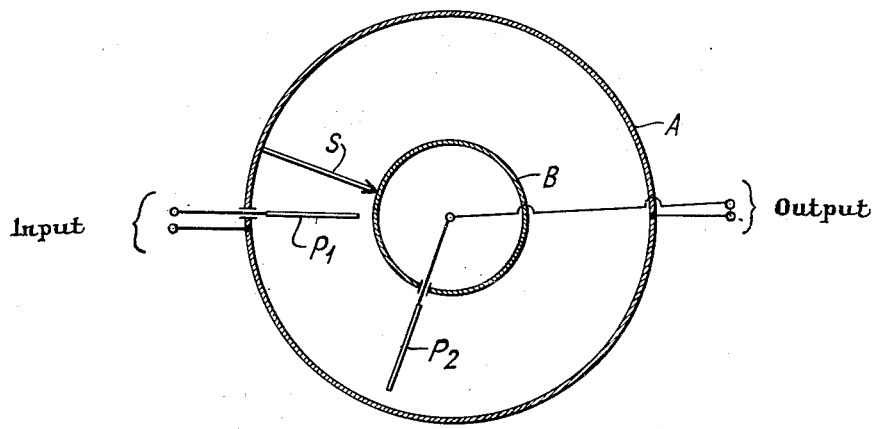
Figure 2:
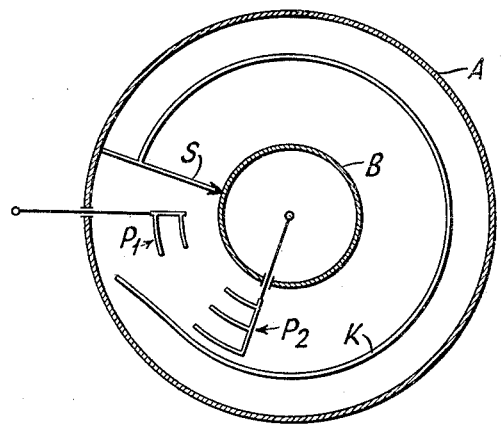

The following is a more detailed description of the invention accompanied by a drawing wherein Figs. 1 and 2 illustrate two embodiments of the invention.

Referring to Fig. 1, A is a metallic cylinder being closed at the ends. Located inside the same is another, similar cylinder B arranged so as to be capable of rotation. Supported inside of cylinder A is the insulated fixed plate $P_1$, while cylinder B is provided with the outside plate $P_2$. Both cylinders are metallically connected with each other. Rotation of B is feasible from the outside by the intermediary of a suitable spindle or shaft on which may be provided a convenient fine-adjustment calibration (vernier) as known in the art. In lieu of the plates $P_1$ and $P_2$, there could be used also cylinders, plate assemblies or the like.

If the input potential is impressed across $P_1$ and A, then the diminished or divided potential may be taken off across $P_2$ and A. The same diminishes approximately with the angle of rotation according to a logarithmic law. If the angle of rotation is over 180°, the same would rise again. In order that this may be avoided, a radial shielding wall or partition S is built in upon one side of $P_1$ which is in conducting relationship with the inner and outer cylinders. In this instance, the angle of adjustment or setting amounts to nearly 360°.

A constant input capacity of the potentiometer is insured by connecting a capacity in parallel to the input, said capacity decreasing with approach of $P_2$ and $P_1$ in the same measure as the capacity $P_2$—$P_1$—load capacity grows. The said compensating capacity may be driven by any suitable agency.

An exemplified embodiment of the latter scheme is shown in Fig. 2. Opposite the plate assembly $P_2$ is a compensator plate K, the distance of which grows in the neighborhood of $P_1$. By ways and means known in the art the distance between K and $P_2$ may be set and fixed at any desired point or value from the outside. The result is that the capacity between $P_2$ and the cylinder is practically independent of the angle of rotation.

The range of regulation of the potentiometer is so much larger, the greater the mean length of rotation of the movable plate compared with the cross-section in which the plate moves.

What is claimed:

1. Variable capacitive voltage divider, with the characteristic feature that in the space between two concentrically and rotatably arranged and electrically interconnected metallic cylinders, two capacity plate systems are disposed, one of which is secured on the outer and the other one to the inner cylinder in an insulated manner, and that the voltage to be divided is impressed between the cylinder arrangement and one of the plate systems, while the subdivided potential is taken off across the cylinder arrangement and the respective other plate system.

2. Variable capacitive voltage divider as claimed in claim 1, with the characteristic feature that upon one side of one of the capacity plate systems is arranged a radial metallic screening wall which is connected with the cylinders.

3. Variable capacitive voltage divider as claimed in claim 1, with the characteristic feature that the cylinder arrangement is shut at its ends.

4. Variable cylindrical voltage divider as claimed in claim 1, with the characteristic features that the plate systems consist of a plurality of elementary plates adapted to interleave comb-fashion.

5. Variable capacitive voltage divider as claimed in claim 1, with the characteristic feature that with a view to stabilizing the input capacity, a capacity varying with the angle of rotation of the voltage divider is connected in parallel relation to the input.

6. A variable capacitive voltage divider comprising concentric inner and outer metallic tubes, said inner tube being rotatable, a fixed metallic plate disposed in the space between said tubes and insulatingly secured to said outer tube, and another metallic plate also disposed in the space between said tubes, said last plate being insulatingly secured to said inner tube and rotatable therewith, an input circuit coupled between the outer tube and one plate, and an output circuit coupled between the inner tube and said other plate.

7. A variable capacitive voltage divider comprising concentric inner and outer metallic tubes metallically connected together, said inner tube being rotatable, a fixed metallic plate disposed in the space between said tubes and insulatingly secured to said outer tube, and another metallic plate also disposed in the space between said tubes, said last plate being insulatingly secured to said inner tube and rotatable therewith, an input circuit coupled between one of said tubes and one plate, and an output circuit coupled between said same tube and said other plate.

8. A variable capacitive voltage divider comprising concentric inner and outer electrically connected cylindrical tubes, one of which is rotatable, a pair of capacity plates in the space between said tubes, said plates being insulated from each other and from said tubes, one of said plates being fixedly positioned while the other of said plates is insulatingly secured to the rotatable tube and movable therewith, said voltage divider being adapted to have the voltage impressed between one of said tubes and one of said plates while the subdivided voltage is derived from between said tube and the other plate.

9. A variable capacitive voltage divider comprising concentric inner and outer electrically connected cylindrical tubes, one of which is rotatable, a pair of capacity plates in the space between said tubes, said plates being insulated from each other and from said tubes, one of said plates being fixedly positioned while the other of said plates is insulatingly secured to the rotatable tube and movable therewith, an input circuit coupled between one of said plates and one of said tubes, an output circuit coupled between said other plate and said tube, and means including a capacitor arranged in parallel relation to said input circuit for maintaining the capacity thereof substantially constant with rotation of the rotatable tube.

WALTER BERNDT.